United States Patent
Zolotykh et al.

(10) Patent No.: US 10,473,273 B1
(45) Date of Patent: Nov. 12, 2019

(54) LAMP WITH INDUCTIVE CONNECTION TO LIGHT ENGINE

(71) Applicants: Valeriy Zolotykh, Abington, MA (US); Ravidasa Hegde, Andover, MA (US); Alberto Pierotti, Cambridge, MA (US)

(72) Inventors: Valeriy Zolotykh, Abington, MA (US); Ravidasa Hegde, Andover, MA (US); Alberto Pierotti, Cambridge, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 16/009,886

(22) Filed: Jun. 15, 2018

(51) Int. Cl.
| | |
|---|---|
| *F21K 9/90* | (2016.01) |
| *F21K 9/238* | (2016.01) |
| *F21V 23/00* | (2015.01) |
| *H02J 50/12* | (2016.01) |
| *F21Y 115/10* | (2016.01) |

(52) U.S. Cl.
CPC .......... *F21K 9/238* (2016.08); *F21K 9/90* (2013.01); *F21V 23/006* (2013.01); *H02J 50/12* (2016.02); *F21Y 2115/10* (2016.08)

(58) Field of Classification Search
CPC ............ H05B 33/0815; H05B 37/0272; H05B 2213/07; H05B 6/062; H05B 6/1236; H05B 33/0806; H05B 33/0845; H05B 33/0857; H05B 37/0227; H05B 2213/05; H05B 2213/06; H05B 33/0809; H05B 33/0842; H05B 3/68
USPC .................. 315/70, 312, 111.21, 111.31, 210
See application file for complete search history.

(56) References Cited

U.S. PATENT DOCUMENTS

| | | | | |
|---|---|---|---|---|
| 2008/0278264 | A1* | 11/2008 | Karalis ................. | B60L 11/182 333/219 |
| 2011/0278942 | A1* | 11/2011 | Eckhoff ............. | A61B 18/1206 307/104 |
| 2011/0278943 | A1* | 11/2011 | Eckhoff ............. | A61B 18/1442 307/104 |
| 2011/0278944 | A1* | 11/2011 | Eckhoff ................. | H02J 5/005 307/104 |
| 2011/0278956 | A1* | 11/2011 | Eckhoff .................... | H02J 4/00 307/149 |

(Continued)

OTHER PUBLICATIONS

Title: Nature Electronics (On-chip intercalated-graphene inductors fornext-generation radio frequency electronics), Author:Banerjee, Kaustav, Publication date: Jan. 8, 2018 and pp. 1-38.*

(Continued)

*Primary Examiner* — Wei (Victor) Chan
(74) *Attorney, Agent, or Firm* — Tutunjian & Bitetto, PC

(57) ABSTRACT

A lamp is provided that includes a housing including a light projecting end and a base having an electrical connector for connection with a lamp fixture; and a light engine including light emitting diodes (LEDs) that is positioned at the light projecting end of the housing. A driver assembly may be in electrical communication with the electrical connector of the base of the housing. In some embodiments, an inductive connection is positioned between the driver assembly and the light engine. The inductive connection may include a transmission coil in the driver assembly, and a receiver coil in the light engine that provides for the transfer of energy magnetically from the driver assembly to the light engine.

13 Claims, 9 Drawing Sheets

(56) References Cited

U.S. PATENT DOCUMENTS

| | | | |
|---|---|---|---|
| 2011/0278957 A1* | 11/2011 | Eckhoff | A61B 17/320068 307/150 |
| 2011/0282415 A1* | 11/2011 | Eckhoff | A61N 1/3787 607/61 |
| 2012/0007519 A1* | 1/2012 | Urano | H05B 33/0815 315/281 |
| 2012/0181973 A1* | 7/2012 | Lyden | B60L 11/182 320/101 |
| 2013/0279164 A1* | 10/2013 | Hsu | F21V 7/0058 362/235 |
| 2014/0197691 A1* | 7/2014 | Wang | H01F 38/14 307/104 |
| 2016/0149442 A1* | 5/2016 | Asanuma | H02J 50/60 307/104 |
| 2016/0238199 A1* | 8/2016 | Yeung | F21V 3/049 |
| 2017/0023204 A1* | 1/2017 | Takeuchi | F21V 9/30 |

OTHER PUBLICATIONS

John Macharia; Wireless Inductive Charging for Low Power Devices; Thesis; Helsinki Metropolia University of Applied Sciences; Jan. 31, 2017.

* cited by examiner

US 10,473,273 B1

LAMP WITH INDUCTIVE CONNECTION TO LIGHT ENGINE

TECHNICAL FIELD

The present disclosure generally relates to light engines employed in lamp assemblies, and more particularly to light engines employing light emitting diodes for the light source.

BACKGROUND

Conservation and management of electrical power are a growing concern with regard to both cost and environmental impact. In various lighting applications, the use of light emitting diodes (LEDs) for illumination is beginning to emerge as a lighting source with potential for addressing these concerns. LED light sources have a long life, are energy efficient, are durable and operate over a wide temperature range. While LED lighting is becoming an attractive option for certain applications, it is not optimal for many applications. Therefore, there is a need for improved LED lighting systems.

SUMMARY

In one aspect, the methods and structures of the present disclosure improves the mechanism of power transfer from an electronic driver to a light engine in a screw base light emitting diode (LED) lamps.

In one embodiment, a lamp is provided that includes a housing including a light projecting end and a base having an electrical connector for connection with a lamp fixture; and a light engine including light emitting diodes (LEDs) positioned at the light projecting end of the housing. A driver assembly may be in electrical communication with an electrical connector of the base of the housing. In some embodiments, an inductive connection is positioned between the driver assembly and the light engine. The inductive connection may include a transmission coil in the driver assembly, and a receiver coil in the light engine that provides for the transfer of energy magnetically from the driver assembly to the light engine.

In another embodiment, a graphene based inductor may provide the source of energy that is magnetically transferred to the light engine in order to power the light engine. In one example, the lamp including the graphene based inductors can include a housing including a light projecting end and a base having an electrical connector for connection with a lamp fixture; a light engine including light emitting diodes (LEDs) positioned at the light projecting end of the housing. A driver assembly may be in electrical communication with the electrical connector of the base of the housing. In some embodiments, an inductive connection including at least one graphene based inductor is positioned between the driver assembly and the light engine. The at least one graphene based inductor may include a transmission coil in the driver assembly, and a receiver coil in the light engine that provides for the transfer of energy magnetically from the driver assembly to the light engine.

In yet another aspect of the present disclosure, a method of powering a light engine of a lamp is provided. In some embodiments, the method may include providing a housing including a light projecting end and a base having an electrical connector for connection with a lamp fixture. A light engine including light emitting diodes (LEDs) can be positioned at the light projecting end of the housing. The light engine may include a receiving coil in electrical communication with the light emitting diodes. A driver assembly can be positioned in electrical communication with the electrical connector of the base of the housing. The driver assembly includes a transmission coil. The transmission coil transfers energy magnetically from the driver assembly to the light engine, wherein the energy is received by the receiver coil. The energy received by the receiver coil illuminates the light emitting diodes (LEDs) of the light engine.

BRIEF DESCRIPTION OF THE DRAWINGS

The following description will provide details of embodiments with reference to the following figures wherein.

DETAILED DESCRIPTION

Figure 1:
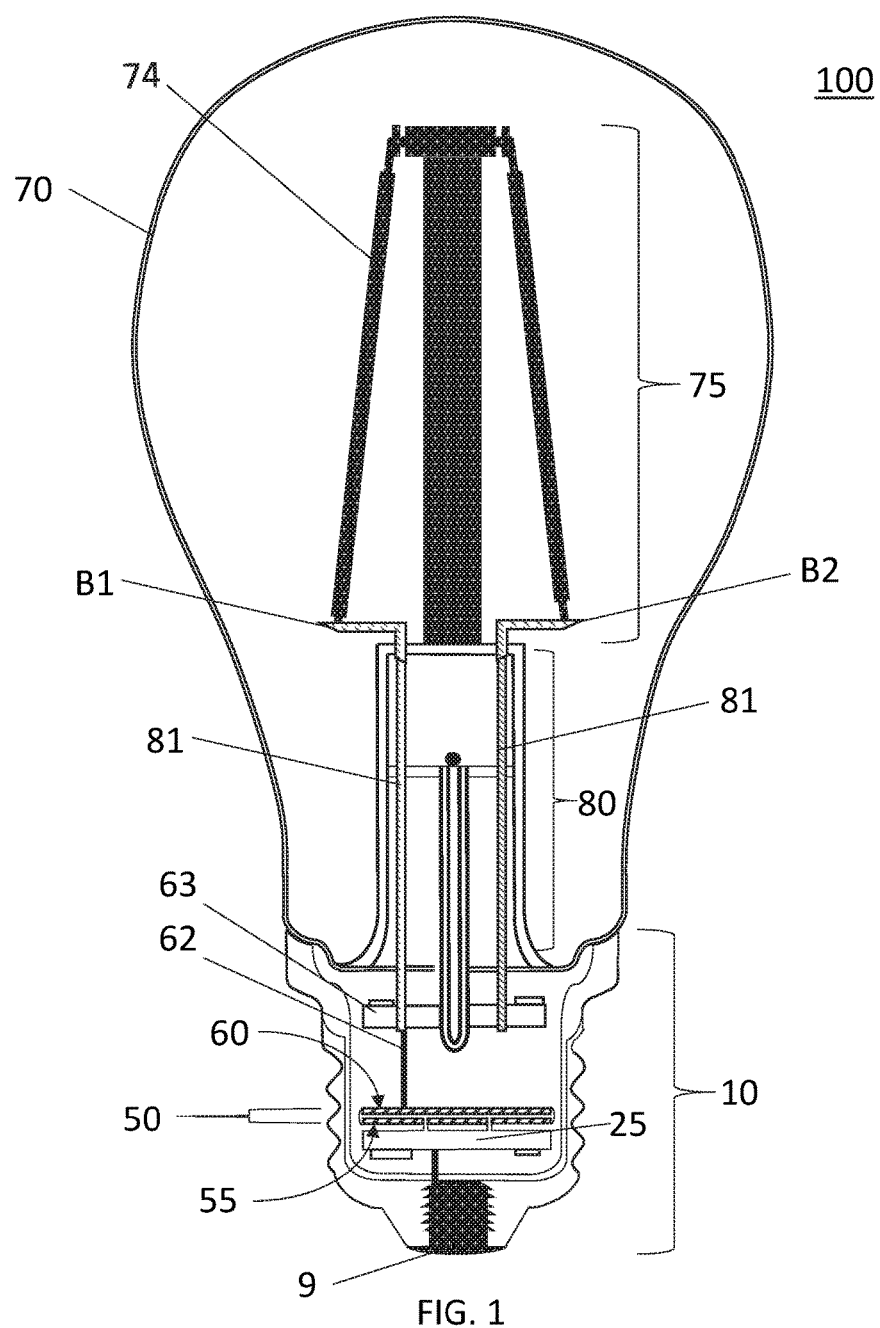
FIG. 1 is a side cross-sectional view of a lamp including an inductive connection between the driver assembly and the light engine of the lamp, in which the inductive connection may include a transmission coil in the driver assembly, and a receiver coil in the light engine that provides for the transfer of energy magnetically from the driver assembly to the light engine.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. As used herein, "direct electrical contact" denotes electrical communication across a physical electrically conductive medium, such as a metal wire. The term "electrical communication" denotes the transmission of power, i.e, power transfer, or electrical current, but does not require direct contact between the elements that are in electrical communication.

In some embodiments, the methods, structures and computer program products that are described herein provide for power transfer from an electronic driver, e.g., driver assembly, to a light engine, e.g., light engine including light emitting diodes (LEDs), in lamp structures including screw in base structures for engaging light fixtures. A screw in base structure is a highly space constrained geometry, and in some embodiments, the methods, structures, and computer program products allow for reducing manufacturing requirements, improving reliability, as well as other benefits to be further described below.

Manual wire twist, wire to contact and/or welding of wires are all methods that have been used to connect the wires from the light engine to the electronic driver of the lamp in order to power the light emitting diodes (LEDs) of the light engine for a lamp. It has been determined that each of the aforementioned methods for connecting the light engine with a power source has a number of disadvantages that can include difficulty with automating high speed lamp assembly, reliability issues to the need for accurate alignment between the wires and contacts between the light engine and the driver electronics; and intermittent connection issues.

Additionally, power supply to lamp structures in some designs can require accurate alignment of the wires with respect to the location of the contacts, which places tight constraints on the tolerance of many other parts within the lamp assembly. In some instances, it can be difficult to achieve accurate alignment in an automated manufacturing assembly process. Some lamps employing spring loaded contacts on the electronics deriver might not function, e.g., when the wires of the light engine do not make electrical contact with the spring loaded contacts on the driver. In some scenarios, the wires of the light engine can have a thin layer of oxidation which can cause poor connection. Under these scenarios, a certain minimum pressure is required to puncture through the layer of oxidation and make good contact. This can impact reliability of a lamp.

In some embodiments, the methods, structures and systems of the present disclosure can overcome the aforementioned difficulties and connectivity issues between the electronic driver components of a lamp and the light engine, e.g., light engine including light emitting diodes (LEDs) of a lamp, by eliminating the need for physical contact through an electrically conductive solid medium, e.g., metal wires, between the light engine and the driver electronics. In some embodiments, the methods, structures and systems of the present disclosure enable the transfer of energy magnetically from an inductive arrangement between the light engine and the driver electronics.

For example, the inductive arrangement may include a transmission coil (Tx) that is in electrical contact with the driver electronics and a receiver coil (Rx) that is in electrical contact with the light engine, in which the transmission coil (Tx) and the receiver coil (Rx) are in electrical communication. More specifically, the transmission coil (Tx) and the receiver coil (Rx) are in electrical communication without requiring direct physical contact between the transmission coil (Tx) and the receiver coil (Rx). By eliminating the need for physical contact through an electrically conductive solid medium, e.g., metal wires, between the light engine and the driver electronics, e.g., by enabling the transfer of energy magnetically via the transmission coil (Tx) and the receiver coil (Rx), the methods, structure and systems of the present disclosure enable greater freedom in the design of the lamp. Further, the application of inductive power generation, as described herein, reduces the requirements for lamp assembly accuracy during serial production. In some embodiments, the methods, structures and systems of the present disclosure have a universal design approach. The driver section with the transmission coil (Tx) can be a universal input design, e.g., accepting both 120V and 230V inputs, and can be used for bulb applications in different countries, where the grid voltage is between 85V to 264V, and 47 Hz to 63 Hz. In some embodiments, only the receiving inductor (Rx) of the light engine inductor portion, i.e., portion of the driver electronics in direct electrical contact with the light engine, which is physically separated from the driver electronics, needs to be designed for specific light engine voltage and current. The methods, structures and computer program products that are provided herein are now described with more detail with reference to FIGS. 1-9.

Figure 2:
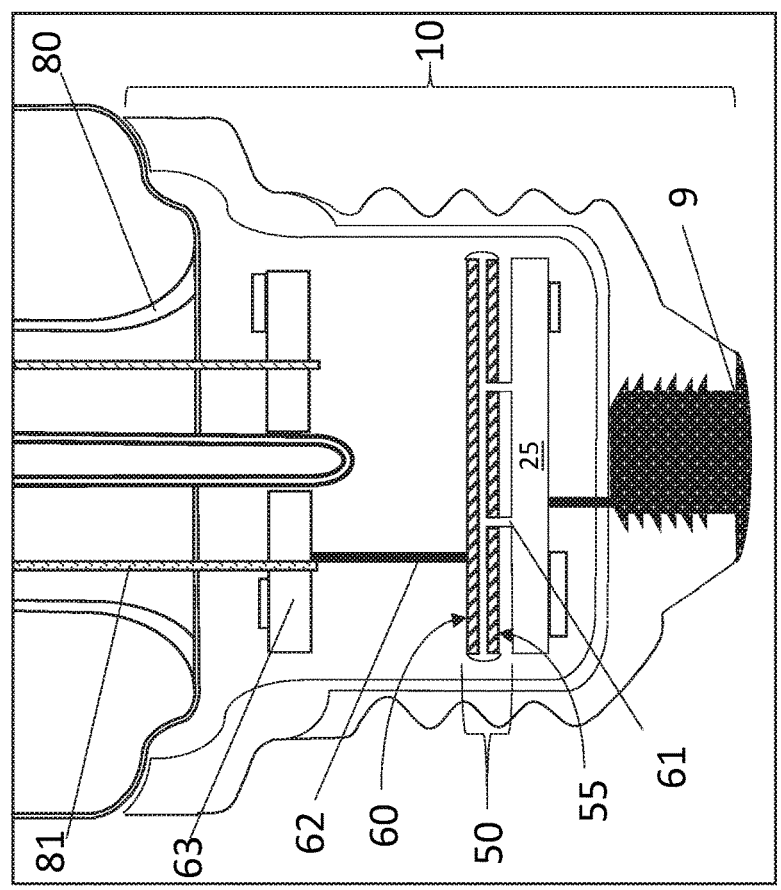
FIG. 2 is a magnified side cross-sectional view of the base section of the lamp depicted in FIG. 1, which further illustrates the inductive connection provided by the receiver coil that is in electrical contact with the light engine and the transmission coil that is in electrical contact with the driver assembly.

FIGS. 1 and 2 depict a lamp 100 including an inductive connection 50 between the driver assembly 25 of the lamp 100, and the light engine 75 (hereafter referred to a light emitting diode (LED) light engine 75) of the lamp 100. The inductive connection 50 may include a transmission coil (Tx) 55 in the driver assembly 25, i.e., in direct contact with the driver assembly, e.g., through physical electrical contacts; and a receiver coil (Rx) 60 in the light engine 75, e.g., in direct contact with the LEDs of the light emitting diodes (LEDs) of the light engine 75. The inductive connection 50 can provide for the wireless transfer of energy magnetically from the driver assembly 25 to the light engine 75.

In the methods, structures and systems described herein, the transfer of energy magnetically is a wireless power transfer. "Wireless power transfer" denotes a number of different technologies for transmitting energy by means of electromagnetic fields. Some examples of the types of electromagnetic energy that can be employed in wireless power transfer can include time varying electric fields, magnetic fields, radio waves, microwaves, infrared and/or visible light waves.

In some embodiments, a wireless power system includes a "transmitter" connected to a source of power, such as the portion of the driver electronics 25 that in direct contact with the base that provides an electrode 9 for connection to the lamp fixture that a lamp 100 is installed into, e.g., through a screw type base housing 10. The "transmitter" that is connected to the source of power can converts the power to a time-varying electromagnetic field. FIGS. 1 and 2 illustrate one embodiment of the present disclosure in which the transmitter is provided by an inductive transmission (Tx) coil 55. In some embodiments, the wireless power system further includes at least one "receiver", which receives the power and converts it back to DC or AC electric current, which is used by an electrical load. In the embodiments depicted in FIGS. 1 and 2, the receiver is in direct electrical contact with the light engine 100, and the electrical load is employed by the light engine 100 to illuminate the light source, e.g., light emitting diodes (LEDs) of the light engine 100. FIGS. 1 and 2 illustrate one embodiment of the present disclosure in which the receiver is provided by an inductive receiver (Rx) coil 60.

During the function of the inductive connector 50, the input power at the inductive transmission coil (Tx) 55 is converted to an oscillating electromagnetic field. In this sense, the inductive transmission coil (Tx) 55 can have some characteristics as an "antenna" device. For example, the inductive transmission coil (Tx) 55 may be a coil of wire which generates a magnetic field. As noted above, the inductive transmission coil (Tx) 55 is connected to the driver electronics 25 for the lamp 100. During the function of the inductive receiver coil 50, the inductive receiver coil (Rx) 60, which is in direct electrical contact with the light engine 75, functions similar to an antenna or coupling device, and converts the oscillating fields to an electric current.

In some embodiments, an important parameter that determines the type of waves employed for power transfer in the inductive connector 50 is the frequency, which determines the wavelength. Wireless power can use the same fields and waves as wireless communication devices like radio. Electric and magnetic fields are created by charged particles in matter, such as electrons. A stationary charge creates an electrostatic field in the space around it. A steady current of charges (direct current, DC) creates a static magnetic field around it. The above fields contain energy, but cannot carry power because they are static. However, time-varying fields can carry power. Accelerating electric charges, such as are found in an alternating current (AC) of electrons in a wire, create time-varying electric and magnetic fields in the space around them. These fields can exert oscillating forces on the electrons in a receiving "antenna", e.g., inductive receiver (Rx) coil 60, causing them to move back and forth. These represent alternating current (AC), which can be used to power a load.

The oscillating electric and magnetic fields surrounding moving electric charges in an antenna device, e.g., inductive transmission coil (Tx) 55 and/or inductive receiver coil (Rx) 60 can be divided into two regions, depending on distance from the antenna.

Near-field or non-radiative region power transfer means power transfer within the area within about 1 wavelength (λ) of the antenna, e.g., inductive transmission coil (Tx) 55 and/or inductive receiver coil (Rx) 60. In this region the oscillating electric and magnetic fields are separate, and power can be transferred via electric fields by capacitive coupling (electrostatic induction) between metal electrodes, or via magnetic fields by inductive coupling (electromagnetic induction) between coils of wire, e.g., the inductive transmission coil (Tx) 55 and/or inductive receiver coil (Rx) 60 that provides the inductive connection 50 within the lamp 100. These fields are not radiative, meaning the energy stays within a short distance of the transmitter, i.e., inductive transmission coil (Tx) 55. If there is no receiving device or absorbing material within their limited range to "couple" to, no power leaves the transmitter. The range of these fields is short, and depends on the size and shape of the "antenna" devices, which are usually coils of wire. Resonance, such as resonant inductive coupling, can increase the coupling between the antennas greatly, i.e., increase coupling between the inductive transmission coil (Tx) 55 and the inductive receiver coil (Rx) 60, allowing efficient transmission at somewhat greater distances, although the fields still decrease exponentially.

In some embodiments, the inductive connector 50 that is employed in the present disclosure may employ inductive coupling technology, which provides short range power transmission, and may employ wavelength frequencies on the order of Hz to MHz. Inductive coupling can employ wire coils for antenna like properties. In some embodiments, the inductive connector 50 that is employed in the present disclosure may employ resonant inductive coupling technology, which provides short range power transmission, and may employ wavelength frequencies on the order of kHz to GHz. Resonant inductive coupling can employ tuned wire coils and/or lumped element resonators for antenna like properties. Resonant inductive coupling is employed in the Qi standard for charging, which is typically employed in mobile phones. Under the Qi specification, "low power" inductive transfers deliver power below 5 W using inductive coupling between two planar coils. These coils are typically 5 mm apart, but can be up to 40 mm and possibly farther apart. Similar technology to the Qi standard can be employed in some of the inductive connectors 50 that are employed herein.

Figure 3:
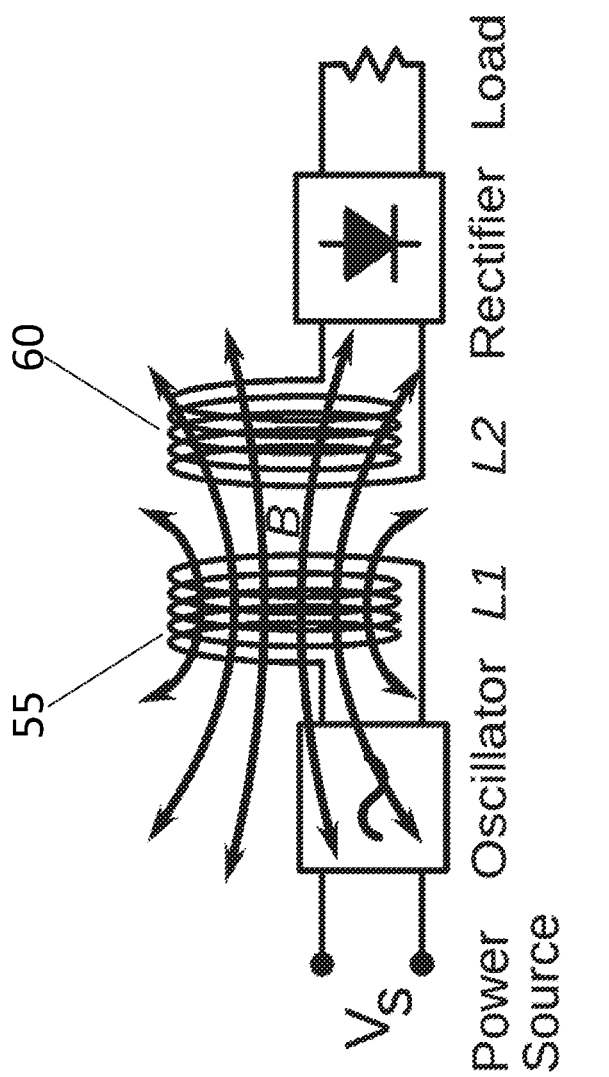
FIG. 3 is a diagram illustrating inductive coupling.

In inductive coupling (electromagnetic induction or inductive power transfer, IPT), power is transferred between coils of wire by a magnetic field (B), as depicted in FIG. 3. The transmitter and receiver coils L1, L2, such as the inductive transmission coil (Tx)(L1) 55 and/or inductive receiver coil (Rx)(L2) 60, together form a transformer, as depicted in FIG. 3. An alternating current (AC) through the transmitter coil (inductive transmission coil (Tx) 55) creates an oscillating magnetic field by Ampere's law. The magnetic field (B) passes through the receiving coil (inductive receiver coil (Rx)(L2) 60), where it induces an alternating EMF (voltage) by Faraday's law of induction, which creates an alternating current in the receiver. The power transferred increases with frequency and the mutual inductance M between the coils, which depends on their geometry and the distance $D_{range}$ between them. A widely used figure of merit is the coupling coefficient $k=M/\sqrt{L1L2}$. This dimensionless parameter is equal to the fraction of magnetic flux through the transmitter coil L1, i.e., inductive transmission coil (Tx)55, that passes through the receiver coil L2, i.e., inductive receiver coil (Rx)60, when the receiver coil L2 is open circuited.

In one example, if the two coils are on the same axis and close together so all the magnetic flux from transmitter coil L1, i.e., inductive transmission coil (Tx)55, passes through receiver coil L2, i.e., inductive receiver coil (Rx) 60, coupling coefficient is equal to 1 (k=1) and the link efficiency approaches 100%. The greater the separation between the coils L1, L2, i.e., inductive transmission coil (Tx)(L1) 55 and the inductive receiver coil (Rx)(L2) 60, the more of the magnetic field from the first coil misses the second, and the lower coupling coefficient (k) and the link efficiency are, approaching zero at large separations. The link efficiency and power transferred is roughly proportional to the coupling coefficient squared ($k^2$). In order to achieve high efficiency, the coils are to be positioned close together, e.g., a fraction of the coil diameter, in some instances within centimeters (cm), with the coils' axes aligned. In some embodiments, the inductive transmission coil (Tx)(L1) 55 and the inductive receiver coil (Rx)(L2) 60 can employ wide, flat coil shapes to increase coupling. In some embodiments, the inductive transmission coil (Tx)(L1) 55 and the inductive receiver coil (Rx)(L2) 60 that provide the inductive coupling 50 of the lamp 100 can employ ferrite "flux confinement" cores to confine the magnetic fields, improving coupling and reducing interference to nearby electronics.

Figure 4:
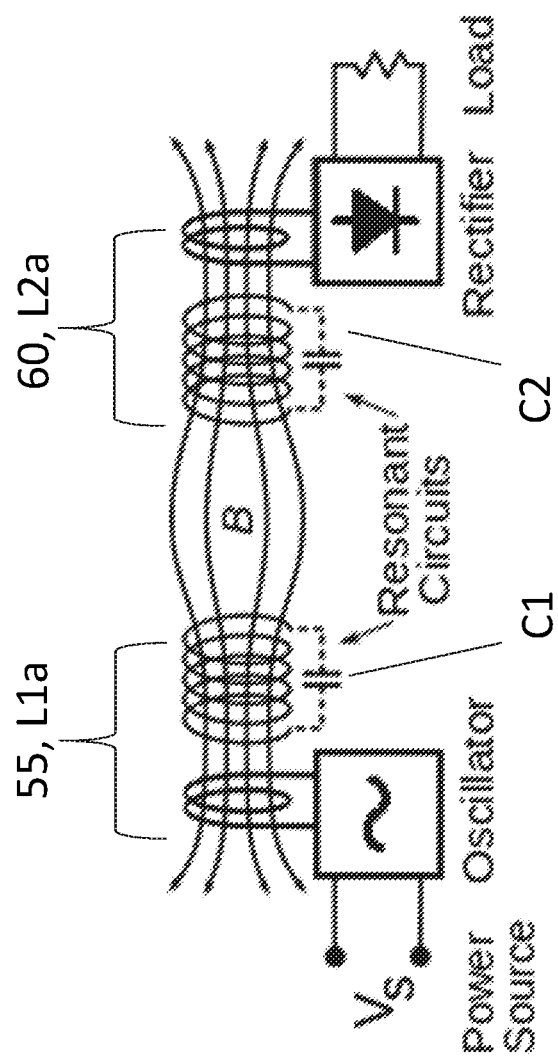
FIG. 4 is a diagram illustrating resonant inductive coupling.

In resonant inductive coupling (also referred to as electrodynamic coupling, and/or strongly coupled magnetic resonance) power is transferred by magnetic fields (B) between two resonant circuits (tuned circuits), one in the transmitter and one in the receiver, as depicted in FIG. 4. Each resonant circuit L1a, L2a consists of a coil of wire connected to a capacitor (C1, C2), or a self-resonant coil or other resonator with internal capacitance. In some embodiments, the two are tuned to resonate at the same resonant frequency. The resonance between the coils L1a, L2a can greatly increase coupling and power transfer. In resonant inductive coupling systems is that high Q factor resonators exchange energy at a much higher rate than they lose energy due to internal damping. Therefore, by using resonance, the same amount of power can be transferred at greater distances, using the weaker magnetic fields out in the peripheral regions ("tails") of the near fields (these are sometimes called evanescent fields). Resonant inductive coupling can achieve high efficiency at ranges of 4 to 10 times the coil diameter. This is called "mid-range" transfer, in contrast to the "short range" of non-resonant inductive transfer, which can achieve similar efficiencies only when the coils are adjacent.

Figure 5:
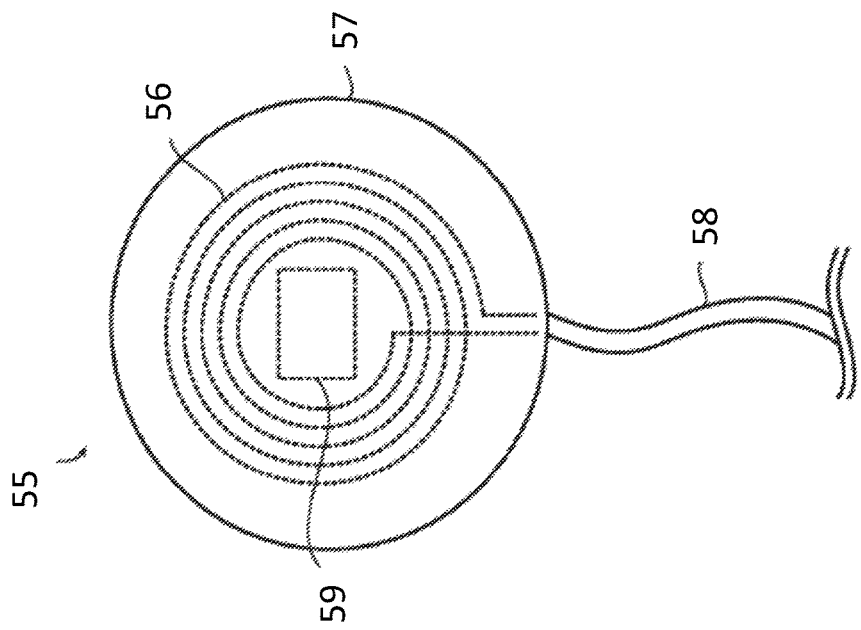
FIG. 5 is a perspective view of one embodiment of an inductive coil, as used in the lamp structures depicted in FIGS. 1-2 including a receiver coil (Rx) and a transmission coil (Tx), in accordance with one embodiment of the present disclosure.

FIG. 5 depicts one embodiment of a coil 55 that can be used in the inductive connection 50, as used in the lamp structures 100 depicted in FIGS. 1-2. Although the coil depicted is identified with reference number 55 illustrating an inductive transmission coil (Tx) of the inductive connection 50 within the lamp 100, the same structure depicted in FIG. 5 is equally applicable for describing the inductive receiver coil (Rx) 60 of the inductive connection 50 within the lamp 100. As described above, the inductive connection 50 may include an inductive transmission coil (Tx) 55 in the driver assembly 25, i.e., in direct contact with the driver assembly, e.g., through physical electrical contacts; and an inductive receiver coil (Rx) 60 in the light engine 75, e.g., in direct contact with the LEDs of the light emitting diodes (LEDs) of the light engine 75, e.g., through physical electrical contacts. In some embodiments, the inductive transmission coil (Tx) 55 generates a power electromagnetic field; and the receiver transmission coil (Rx) 60 produces an AC/DC current when placed in the power electromagnetic field, in which the AC/DC current powers the light engine 75.

In a non-limiting example depicted in FIG. 5, the inductive transmission coil (Tx) 55 may be formed from a wire or other suitable conductive element that may be configured to form a plurality of concentric loops or converging or spiraling circles, which can be collectively referred to as coils 56. The wire that provides the coils 56 for forming inductive transmission coil (Tx) 55 may be formed from any suitable conductive material including, but not limited to, metals, conductive polymers, conductive composites and the like. For example, the coils 56 can be composed of copper (Cu).

In some embodiments, the coils 56 can be composed of Litz wire. Litz wire is a multi-strand wire or cable that can carry alternating current (AC) at radio frequencies. Litz wire consists of multiple strands insulated electrically from each other. For example, the multiple strands of wire can be copper wire. Litz wire can reduce the skin effect and proximity effect losses in conductors used at frequencies up to about 1 MHz. Litz wire can consist of many thin wire strands, individually insulated and twisted or woven together, following one of several prescribed patterns often involving several levels (groups of twisted wires are twisted together, etc.). The result of these winding patterns is to equalize the proportion of the overall length over which each strand is at the outside of the conductor. The windings distribute the current equally among the wire strands, reducing the resistance. The inductive transmission coil (Tx) 55 can be composed of one or two coils 56 of Litz wire. Each coil 56 may include a lead portion 59 for engagement to another component of the lamp 100. For example, the inductive transmission coil (Tx) 55 can be in direct electrical contact with the driver electronics 25 through the lead portions 58 of the coils 56. For example, the inductive receiver coil (Rx) 60 can be in direct electrical contact with the light engine 75 through the lead portions 58 of the coils 56.

In some embodiments, the number of coils 56, i.e., the number of turns in the coils 56, in the inductive transmission coil (Tx) may range from 2 to 50 turns. It is noted that the number of turns in the coils 56 of the inductive transmission coil (Tx), as well as the inductive receiver coil (Rx), is not limited to only the aforementioned example. In other examples, the number of turns in the coils 56 for the inductive transmission coil (Tx) and the inductive receiver coil (Rx) may range from be equal to 2, 3, 4, 5, 6, 7, 8, 9, 10, 15, 20, 25, 30, 35, 40, 45, 50, 55, 60, 65, 70, 75, 80. 85, 90, 95 and 100, as well as any range of turns in the coils 56 including one of the aforementioned examples for the minimum endpoint for the range, and one of the aforementioned examples for the maximum endpoint for the range.

In some embodiments, the gauge of wire in the coils 56 for the inductive transmission coil (Tx) and the inductive receiver coil (Rx) may range from 12 gauge and 36 gauge wire.

In some embodiment, the coils 56 for the inductive transmission coil (Tx) 55 are mounted to a supporting substrate 57. In some embodiments, the supporting substrate 57 may be a ferrite sheet, e.g., nickel zinc (NiZn) ferrite sheet. In some embodiments, by placing the coils 56 on the ferrite sheet, the ferrite sheet supporting substrate 57 can provide a magnetic shield to ensure that the magnetic fields being produced are localized within the lamp 100 where they are useful for power generation, and do not result in unnecessary interference. In some embodiments, an adhesive or adhesive tape may provide the proper fixation of the coils 56 to the supporting substrate 57.

In some embodiments, the inductive transmission coil 55 may also include an alignment magnet 59. The alignment magnet 59 may be positioned within the center of transmission coils 56, such that the wires of inductive transmission coil 55 substantially surround alignment magnet 59. The alignment magnet 59 may be utilized to align the inductive transmission coil (Tx) 55 with the inductive receiving coil (Rx) 60 for transmitting powering the light engine 75, as discussed herein. The inductive receiving coil (Rx) 60 includes a similarly positioned alignment magnet, i.e, positioned within the center of the coils for the inductive receiving coil (Rx) 60, wherein the alignment magnet of the inductive receiving coil (Rx) 60 is configured to be attracted to the alignment magnet 59 of the inductive transmission coil (Tx) 55. The application of the alignment magnets can facilitate alignment of the inductive receiving coil (Rx) 60 and the inductive transmission coil (Tx) 55 during assembly of the lamp 100. In some embodiments, the inductive transmission coil (Tx) 55 that is depicted in FIG. 5, as well as the similar inductive receiving coil (Rx) 60, can provide an inductance ranging from 6 uH to 27 uH. The DC resistance of the coil can range from 20 mΩ to 100 mΩ. The working frequency of the coil can range from 105 kHz to 210 kHz. In some embodiments, the working voltage of the coil can range from 5 V to 300 V.

In some embodiments, the inductive connection 50 of the lamp 100 depicted in FIGS. 1 and 2 that employs the inductive transmission coil (Tx) 55 that is depicted in FIG. 5, as well as the similar inductive receiving coil (Rx) 60, can provide for a level of power transfer from the driver electronics 25 to the light engine 75 that can be characterized as low power, e.g., up to 5 W on the receiver side, i.e., received and measured at the inductive receiving coil (Rx) 60. In other embodiments, the inductive connection 50 of the lamp 100 depicted in FIGS. 1 and 2 that employs the inductive transmission coil (Tx) 55 that is depicted in FIG. 5, as well as the similar inductive receiving coil (Rx) 60, can provide for a medium level of power transfer from the driver electronics 25 to the light engine 75, which can range from 5 W to 100 W. In yet another embodiment, the inductive connection 50 of the lamp 100 depicted in FIGS. 1 and 2 that employs the inductive transmission coil (Tx) 55 that is depicted in FIG. 5, as well as the similar inductive receiving coil (Rx) 60, can provide for a medium level of power transfer from the driver electronics 25 to the light engine 75, which can range from 100 W to 1 kW. In yet an even further embodiment, the inductive connection 50 of the lamp 100 depicted in FIGS. 1 and 2 that employs the inductive transmission coil (Tx) 55 that is depicted in FIG. 5, as well as the similar inductive receiving coil (Rx) 60, can provide for a high level of power transfer from the driver electronics 25 to the light engine 75, which can exceed 1 kW.

The description of the inductive transmission coil (Tx) 55 and the inductive receiver coil (Tx) 60 is provided for illustrative purposes. However, it is understood that the inductive transmission coil (Rx) 55, as well as the inductive receiver coil (Rx) 60, of the lamp 100 may be formed from any suitable material and may be configured in a variety of geometries to allow the transfer of power to the lamp 100, as discussed herein. Further, the size, shape, spacing and/or location of the inductive transmission coil (Tx) 55, as well as the inductive receiver coil (Rx) 60, and constituent loops may vary between embodiments.

For example, each of the inductive transmission coil (Tx) 55, and the inductive receiver coil (Rx) 60 may be composed of a printed circuit board (PCB) inductor. A printed circuit board (PCB) inductor may also be referred to as a planar inductor, and includes coils that are mounted to a circuit board, such as a circuit board composed of FR4. The coils of the PCB inductor may be composed of a metal, such as copper (Cu).

Figure 6:
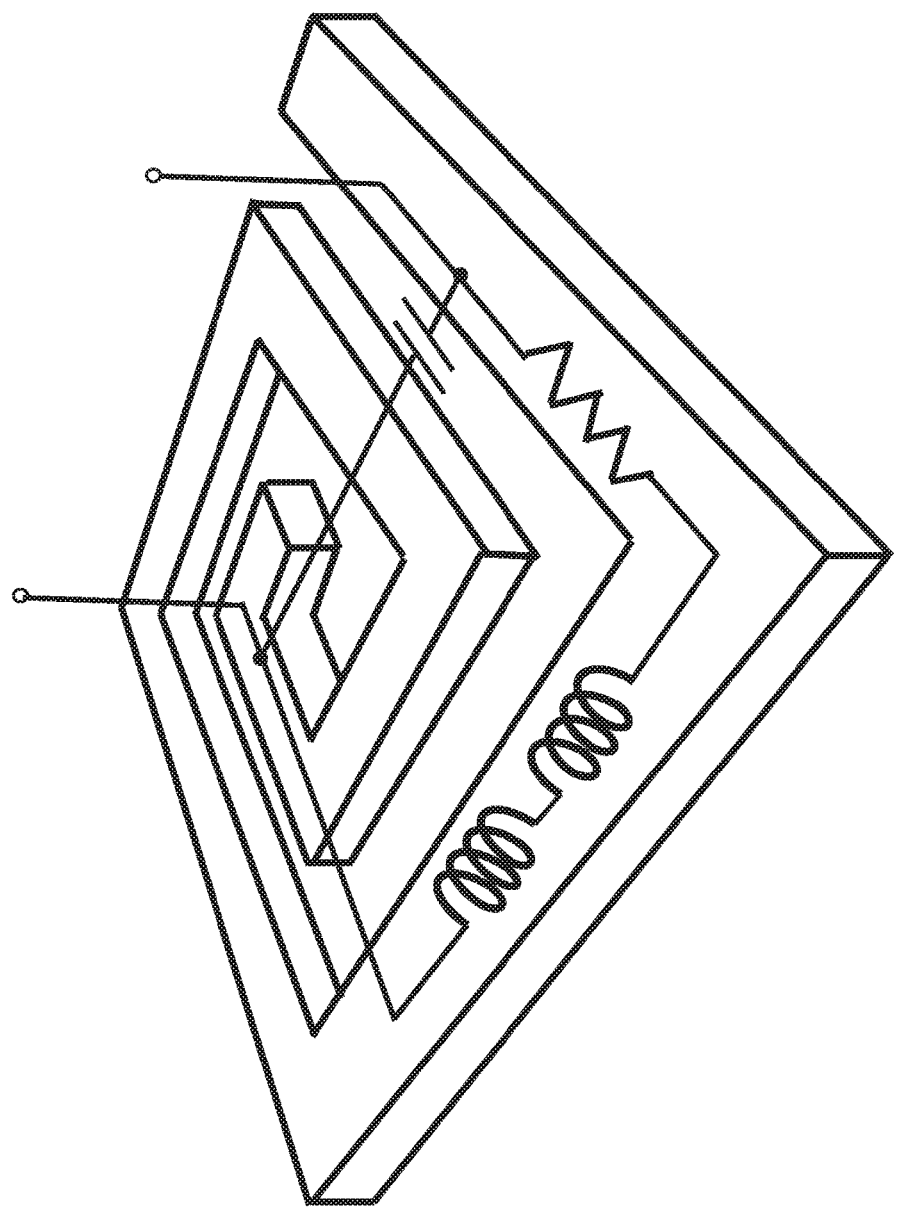
FIG. 6 is a perspective view of another embodiment of an inductive connection including graphene based inductors, in accordance with the present disclosure.

In yet another embodiment, each of the inductive transmission coil (Tx) 55, and the inductive receiver coil (Rx) 60 may be composed of a graphene inductor, as depicted in FIG. 6. FIG. 6 illustrates one embodiment of a intercalated graphene coil, and corresponding circuit diagram, that can provide the inductive transmission coil (Tx) 55, and/or the inductive receiver coil (Rx) 60. The graphene coil depicted in FIG. 6 may function in the 10 GHz to 50 GHz range thanks to the mechanism of kinetic inductance—rather than magnetic inductance. In some embodiments, each of the inductive transmission coil (Tx) 55, and the inductive receiver coil (Rx) 60 may be composed of a graphene inductor that is a bromine-intercalated graphene spiral. The bromine-intercalated graphene spiral can be formed by first transferring millimeter sized highly orientated pyroltyic graphite slices onto quartz substrates, which is followed by bromine gas being diffused into the gaps between the graphene layers. The graphite slices are then patterned using photolithography. A polymeric dielectric layer can be added to isolate the spirals from overlapping metal contacts.

FIGS. 1 and 2 depict a lamp 100 including an inductive connection 50 between the driver assembly 25 of the lamp 100, and the light engine 75 (hereafter referred to a light emitting diode (LED) light engine 75) of the lamp 100. As illustrated in FIGS. 1 and 2, the driver assembly 25 is in direct electrical communication with the inductive transmission coil (Tx) 55 through the driver physical interconnect 61 that is in direct contact with both the driver assembly 25 and the inductive transmission coil (Tx) 55. The driver physical interconnect 61 may be provided by a wire, electrically conductive stud or any physical connection that conducts electricity at room temperature, e.g., 20° C. to 25° C. For example, the driver physical interconnect 61 may be wired to the lead portions 58 of the inductive transmission coil (Tx) 55. The driver assembly 25 may also be referred to as an alternating current (AC) side of the printed circuit board (PCB) for the lamp 100.

As illustrated in FIGS. 1 and 2, the light engine 75 is in direct electrical communication with the inductive receiver coil (Rx) 60 through the light engine physical interconnect 62. In some embodiments, the light engine physical interconnect 62 is in direct contact with both the light engine 75 and the inductive receiver coil (Rx) 60. The light engine physical interconnect 62 may be provided by a wire, electrically conductive stud or any physical connection that conducts electricity at room temperature, e.g., 20° C. to 25° C. In some embodiments, the light engine physical interconnect 62 may be in direct contact with the light engine (LE) printed circuit board (PCB) 63 that the light emitting diodes (LEDs) of the light engine 75 are in electrical communication with. In one example, the light engine physical interconnect 62 may be wired to the lead portions 58 of the inductive receiver coil (Rx) 60.

It is noted that the inductive receiver coil (Rx) 60 and inductive transmitter coil (Tx) 55 are entirely separated from one another. There is no direct electrical contact between the inductive receiver coil (Rx) 60 and inductive transmitter coil (Tx) 55. In some embodiments, shielding may be adjacent to the inductive receiver coil (Rx) 60 and the inductive transmitter coil (Tx) 55 to control the direction of emission of magnetic fields/waves and/or electronic fields/waves.

Referring to FIG. 1, the light engine 75 for the lamp 100 may include a light source that is provided by light emitting diodes (LEDs). A light emitting diode (LED) is a form of solid state light emitter. The term "solid state" refers to light emitted by solid-state electroluminescence, as opposed to incandescent bulbs (which use thermal radiation) or fluorescent tubes, which use a low pressure Hg discharge. In a broad sense, a light emitting diode (LED) is a semiconductor device that emits visible light when an electric current passes through it. Some examples of solid state light emitters that are suitable for the methods and structures described herein include inorganic semiconductor light-emitting diodes (LEDs), organic light-emitting diodes (OLED), polymer light-emitting diodes (PLED), surface mount light emitting diodes (SMT LEDs) or combinations thereof. The LEDs can be mounted to a panel, also referred to as a substrate, in which the LEDs may include several surface mount device (SMD) light emitting diodes (LEDs). In one example, a household LED bulb can contain a single LED 31 to arrays of 5 to 10 LEDs.

The LEDs of the light engine 75 of the lamp 100 may be selected to emit a specific color. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. In some examples, the LEDs of the light engine 75 of the lamp 100 are capable of adjusting the "color" of the light they emit.

The LEDs of the light engine 75 of the lamp 100 may be selected to emit a specific color temperature. The "color temperature" of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in kelvins, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs of the lamp 100 provided herein may emit light having the aforementioned examples of color temperatures. In some examples, the LEDs of the light engine 75 of the lamp 100 are capable of adjusting the "color temperature" of the light they emit.

The LEDs of the light engine 75 of the lamp 100 may be selected to emit a specific light intensity. In some examples, dimming or light intensity may be measured using lux. In some embodiments, the LEDs of the light engine 75 can provide lighting having an intensity between 100 lux to 1000 lux. For example, lighting for office work may be comfortably done at a value between 250 lux to 500 lux. For greater intensity applications, such as work areas that involve drawing or other detail work, the intensity of the lamps can be illuminated to a range within 750 lux to 1,000 lux. In some embodiments, the LEDs of the light engine 75 of the lamp 100 are capable being adjusted to adjust the light intensity/dimming of the light they emit.

In the embodiment that is depicted in FIGS. 1A and 1B, the light engine 75 may include LEDs that are part of an LED filament structure 74. The LED filament structure 74 may include a substrate and a plurality of series connected light emitting diodes (LEDs) that are present on the substrate that extending from a cathode contact portion of the LED filaments structure to an anode contact portion of the LED filament structure 74. The series connected light emitting diodes (LEDs) of the LED filament structure can be covered with a phosphorus coating. In some embodiments, each of the light emitting diode (LED) filament structures 74 includes LED's arranged in rows on small strips. In one example, the number of LEDs arranged on the substrate of the light emitting diode (LED) filaments structure 74 can range from 10 LEDs to 50 LEDs. In another example, the number of LEDs arranged on the substrate of the light emitting diode (LED) filaments structure 74 may range from 15 LEDs to 40 LEDs. In yet another example, the number of LEDs arranged on the substrate of the light emitting diode (LED) filaments structure 74 may range from 20 LEDs to 30 LEDs. The LEDs present on the substrate of the light emitting diode (LED) filaments structure 74 can be electrically connected in series extending from the cathode contact portion to the anode contact portion of the LED filament structure 74.

In some embodiments, the LED filament structure 74 is composed of a metal strip with series of LEDs aligned along it. A transparent substrate, usually made from glass, e.g., silicon (Si) and/or silicon oxide ($SiO_2$), or sapphire, e.g., aluminum oxide ($Al_2O_3$), materials are used to cover the LED's. This transparency allows the emitted light to disperse evenly and uniformly without any interference or light loss. The LEDs may be referred to as chip on board (COB) and/or chip on glass (COG). In one example, the LED's on the filament strip emit a blue colored light. For example, the blue light emitted by the LEDs on the filament strip of the LED filaments may have wavelengths ranging from approximately 490 nm to 450 nm. To provide "white light" a coating of phosphor in a silicone resin binder material is placed over the LEDs and glass to convert the blue light generated by the LEDs of the LED filament structure 74. White light is not a color, but a combination of all colors, hence white light contains all wavelengths from about 390 nm to 700 nm. Different phosphor colors can be used to change the color of the light being emitted by the LEDs. For example, the more yellow the phosphor, the more yellow and warm the light becomes. Each of the light emitting diode (LED) filament structures 74 may have a length on the order of 4" and a width on the order of ⅛".

In one example, the light engine 75 may include three or four light emitting diode filament structures 74 that are arranged in a cone like geometry. A "cone-like" geometry is a three-dimensional geometric shape that tapers from a substantially flat base to a point called the apex of the cone. In some embodiments, the plurality of light emitting diode (LED) filament structures 74 all connected at a common apex interface A1, in which the common apex interface A1 of the connected plurality of light emitting diodes (LED) filament structures provides the apex of the cone like geometry.

Still referring to FIG. 1, the light emitting diode (LED) filament structures 74 each include a cathode contact portion, and an anode contact portion. The anode and cathode are defined by the flow of current. In the general sense, current refers to any movement of electrical charge. The cathode contact portion is the negatively charged electrode for the light emitting diode (LED) filament structures 74. The anode contact portion is the positively charged electrode for the light emitting diode (LED) filament structures 74. The anode and cathode contact portions for each of the light emitting diode (LED) filament structures 74 are either joined, e.g., by weldment, to the anode supporting base contact B1 having the first arcular geometry, the cathode supporting base contact B2 the second arcular geometry, or are joined at the common apex interface A1 to provide that the plurality of light emitting diode (LED) filament structures are all connected. The term "arcular" denotes that the geometry consists of at least one "arc". The term "arc" denotes a part of the circumference of a circle or other curve. The anode support base contact B1, and the cathode supporting base contact B2, may each be provided by a sectioned portion of a snap ring, which provides the base of the cone geometry of the light engine 75 that is depicted in FIG. 1

It is noted that the light engine 75 of the present disclosure is not limited to including three or four light emitting diode (LED) filament structures 74 that are electrically interconnected at an upper surface of the light engine 75 at the common apex interface A1 and each separately connected to one of the anode and cathode contact supporting base portions B1, B2, as depicted in FIG. 1. The light engines 75 of the present disclosure may include other numbers light emitting diode (LED) filament structures 74. For example, the number of light emitting diode (LED) filament structures 74 positioned between the common apex interface A1 and the anode and cathode contact supporting base portions B1, B2 may be equal to 2, 3, 4, 5, 6, 7, 8, 9, 10 and 15, as well as any range of light emitting diode (LED) filament structures 74 including one of the aforementioned examples for the minimum endpoint for the range, and one of the aforementioned examples for the maximum endpoint for the range.

The light engine 75 composed of light emitting diode filament structures 74 that is depicted in FIG. 1 is a self-supporting design. In this design, the filaments 74 are supported by their contact base structures and the upper portion of the light engine 75 is characterized as a common apex A1 at which the entirety of the light emitting diode filament structures 74 are interconnected. The present disclosure is not limited to only this design. For example, a light engine 75 of filament light emitting diode (LED) structures 74 may also be employed in which the filament light emitting diode (LED) structures 74 are interconnected using a glass arbor and wiring support structure. In each of the aforementioned examples, the light engine 75 may be illuminated by a power from 2 W to 15 W.

The light engine 75 is directly fixed to the stem 80. The stem 80 is in electrical communication with the inductive receiver coil (Rx) 60. More specifically, in some embodiments, the light engine 75 is positioned within the globe 70 by connection to the lead wires 81 that are supported by the stem 80. The stem 80 is a pillar extended toward the inside of the globe 70. Before further describing the stem 80 of the light engine 75, a description of the globe 70 is provided. In some embodiments, the globe 70 is a hollow translucent component, houses the light engine 100, 100*a* inside, and transmits the light from the light engine 100, 100*a* to outside of the lamp 100, 100*a*. In some embodiments, the globe 70 is a hollow glass bulb made of silica glass transparent to visible light. In other embodiments, the globe 70 may be composed of transparent plastic. The globe 70 can have a shape with one end closed in a spherical shape, and the other end having an opening for engagement to the base 10. In other words, the shape of the globe 70 is that a part of hollow sphere is narrowed down while extending away from the center of the sphere, and the opening is formed at a part away from the center of the sphere. In the embodiment that is depicted in FIG. 1, the shape of the globe 70 is Type A (JIS C7710) which is the same as a common incandescent light bulb. It is noted that this geometry is provided for illustrative purposes only, and is not intended to limit the present disclosure. For example, the shape of the globe 70 may also be Type G, Type E, or others.

In some embodiments, the light engine 75 that is positioned within the globe 70 includes anode and cathode contact base portions B1, B2 are can be fixed to the ends of the lead wires 81 that extend through the stem 80. In some embodiments, the stem structure 80 is positioned between the light engine 75 and the inductive receiver coil (Rx) 60. Electrical connection between the light engine 75 and the inductive receiver coil (Rx) 60 can include wire lead wires 81 in contact with the anode supporting base contact B1 and the cathode supporting base contact 50, which may also be in contact with the light engine (LE) printed circuit board (PCB) 63. Electrical communication to the inductive receiver coil (Rx) 60 may continue from the light engine (LE) printed circuit board (PCB) 63 to the inductive receiver coil (Rx) 60 via the physical light engine physical interconnect 62.

The stem 80 can be made of soft glass transparent to visible light. Note that, it is not necessary for the stem 80 to be transparent to the visible light, or to be made of soft glass. For example, the stem 80 may be a component made of a highly heat-conductive resin. As the highly heat-conductive resin, silicone resin in which metal particles such as alumina or zinc oxide are mixed may be used. The two lead wires 81 contribute to holding the light engine 75 at a constant position in the globe 70. The power supplied from the inductive receiver coil (Rx) 60 is supplied to the light engine 75 through the two lead wires 81. Each of the lead wires 81 may be a composite wire including an internal lead wire, a Dumet wire (copper-clad nickel steel wire) and an external lead wire joined in this order.

In some embodiments, the end portion of the stem 80 that is opposite the end of the stem 80 connected to the light engine 75 includes a flared shape that can be coinciding with the shape of the opening of the globe 70 that corresponds to the geometry of the base 10. The end portion of the stem 80 can be formed in the flared shape to be joined with the opening of the globe 70 so as to close the opening of the globe 70, and connect with the base 10 of the lamp.

The base 10 of the lamp 100, and the globe 70 of the lamp 100, provides the lamp housing. The lamp housing includes a light projecting end provided by the globe 70 and a base 10 having an electrical connector 9 for connection with a lamp fixture. The electronics package, which includes the light engine printed circuit board 63, the inductive receiving coil (Rx) 60, the inductive transmission coil (Tx) 55, and the driver assembly 25 are present in a portion of the base 10 of the lamp 100 that engages the lamp fixture.

The base 10 can be composed of a resin material. In some embodiments, the base 10 is attached to the globe 70 using an adhesive, such as cement. The electrical connector 9 is connected to the end of the base 10 that is opposite the end of the base 10 that is closest to the globe 70. In the embodiment that is depicted in FIG. 1, the base 10 is an E26 base. The light bulb shaped lamp can be attached to a socket for E26 base connected to the commercial AC power source for use. Note that, the base 10 does not have to be an E26 base, and maybe a base of other size, such as E17. In addition, the base 10 does not have to be a screw base, and may be a base in a different shape such as a plug-in base.

Figure 7:
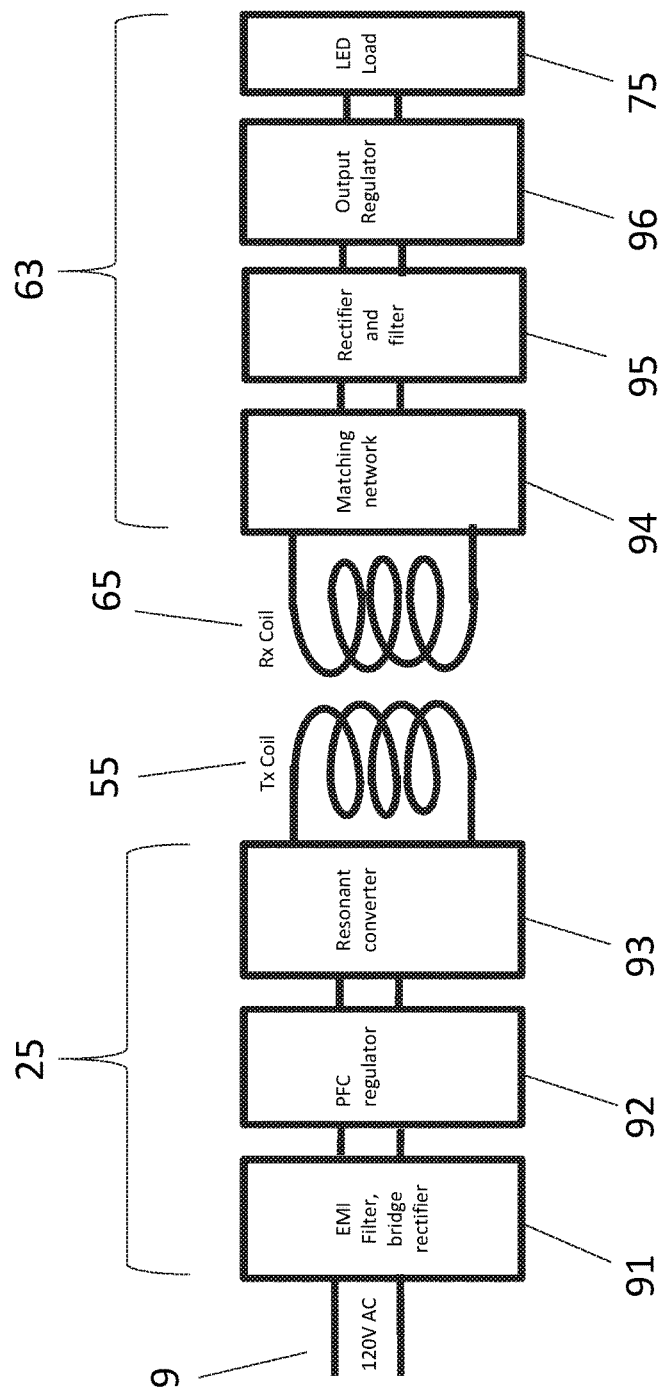
FIG. 7 is an illustration (block diagram) illustrating the electrical scheme for connectivity of the transmission coil through the driver assembly to the base of the lamp; and the receiver coil to the light engine of the lamp, in accordance with one embodiment of the present disclosure.

Referring to FIGS. 1, 2 and 7, the inductive connection 50, i.e., the combination of the inductive transmission coil Tx 55, and the inductive receiving coil Rx 60, is a component of an electronics package that is present in the base 10 of the lamp 100. Broadly, the electronics package that is positioned within the base 10 of the lamp 100 includes the light engine printed circuit board 63, the inductive receiving coil (Rx) 60, the inductive transmission coil (Tx) 55, and the driver assembly 25.

FIG. 7 is an illustration (block diagram) illustrating one embodiment of the electronics package having the inductive connection 50 that provides for wireless power transmission between the driver assembly 25 portion of the electronics package that receives electricity from the electrical connector 9 of the base 10 when the lamp 100 is engaged to a lamp fixture, and the light engine 75 for illuminating the light source, e.g., light emitting diodes (LEDs).

In one embodiment, the components of the inductive transmission coil (Tx) 55 portion of the electronics package includes an EMI filter and bridge rectifier 91, a PFC regulator 92 and a resonant converter 93. These components may be integrated into the driver assembly 25, and in some examples may be referred to as the driver electronics or light emitting diode (LED) driver.

The electromagnetic interference (EMI) filter and bridge rectifier 91 accepts the main input that is received by the electrical connector 9, e.g., 120V AC. The EMI filter and bridge rectifier 91 can also provide for filtering of high frequency noises that are generated by the subsequent stages of the components in the electronics package from being fed back into the mains input and creating electromagnetic interference with other devices connected in the same line. The EMI filter and bridge rectifier 91 also rectifies input voltage, e.g., 120V AC, and converts it into a direct current (DC) supply.

Following the conversion to DC supply by the EMI filter and bridge rectifier 91, the DC supply passes to the power factor (PFC) regulator 92. The PFC regulator 92 provides that the power factor of the power being drawn by the LED driver is closer to "unity", and minimizes the distortion in the input current waveform. In some embodiments, by monitoring the instantaneous line voltage and controlling the input current to be proportional to the input voltage, the shape of the of the current waveform is maintained to be similar to the input voltage waveform to achieve a close to unity power factor. Further, in some embodiments, the total harmonic distortion of the input current is kept below 20%. In providing this, the PFC regulator 92 can also achieve a fairly regulated direct current (DC) output voltage, e.g., 200V DC, at the output of the PFC regulator 92. In some embodiments, the DC output voltage of the PFC regulator 92 is higher than the peak input voltage. In some embodiments, the PFC regulator 92 can be omitted from the LED driver (also referred to as driver assembly 25).

The LED driver (also referred to as driver assembly 25) may also include a resonant converter stage 93. The resonant converter stage 93 can be used to generate the high frequency AC voltage for the wireless transmitter coil, i.e., inductive transmitter coil (Tx) 55. In some embodiments, the high frequency AC voltage may be between 105 KHz to 210 KHz. The resonant converter stage 93 may be controlled using a self-oscillating circuit, or controller using a controller IC. The transmitter coil inductance and capacitance in this circuit can resonate at a certain pre-determined frequency and generate a high frequency, e.g., greater than 110 KHz, sinusoidal voltage.

Figure 8:
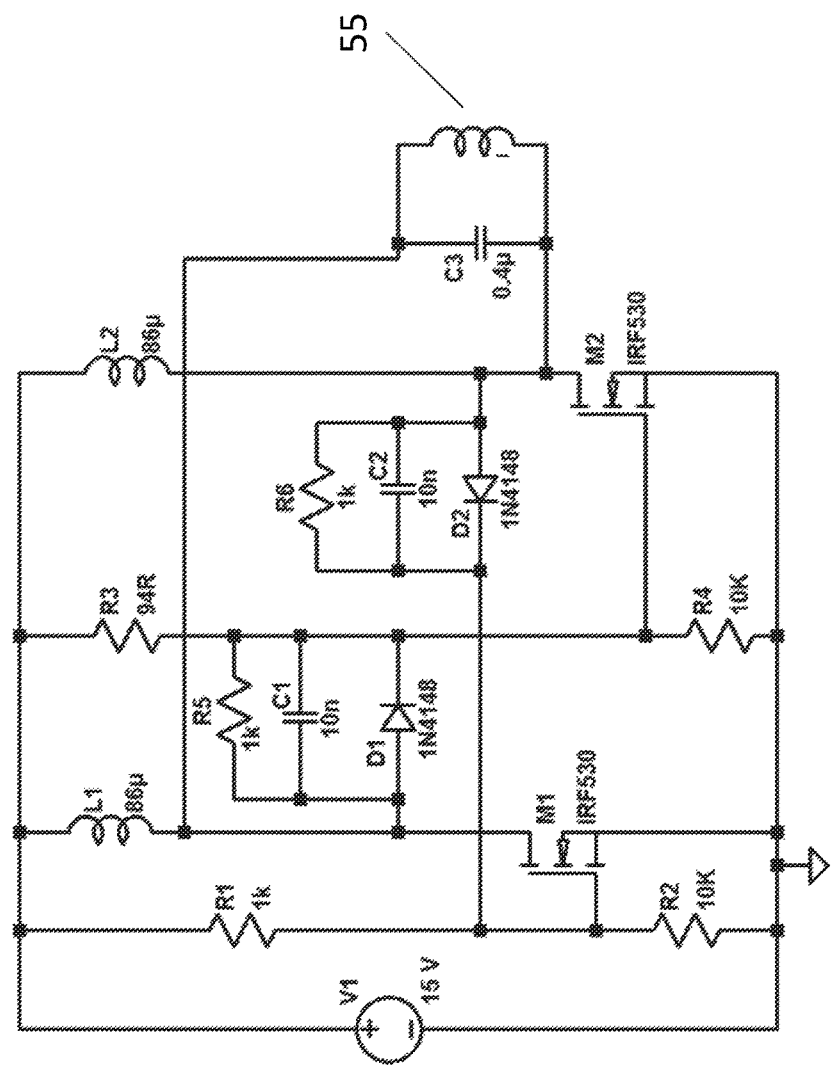
FIG. 8 is a circuit diagram illustrating one embodiment of a resonant converter stage of the electrical scheme described in FIG. 7, in accordance with one embodiment of the present disclosure.

FIG. 8 illustrates one embodiment of a self-oscillating circuit that can be employed in the resonant converter stage 93. In some examples, the goal of the oscillating circuit is to generate a sine wave having a high oscillating current. This provides a strong magnetic field. A sinusoidal oscillator is preferred having a regenerative (positive) feedback. The circuit depicted in FIG. 8 is an example of a Royer oscillator utilizing N-channel MOSFETs.

The controller integrated circuit (IC) of the resonant converter stage 93 may be a microcontroller that functions to generate the high frequency AC voltage for the wireless transmitter coil. In some examples, the goal of the oscillating circuit is to generate a sine wave having a high oscillating current. The microcontroller for the controller integrated circuit (IC) of the resonant converter stage 93 may include a processor, e.g., hardware processor, and memory (hereafter referred to as controller memory). The controller memory can be of any suitable memory type (e.g., RAM and/or ROM, or other suitable memory) and size, and in some cases may be implemented with volatile memory, non-volatile memory, or a combination thereof. Some examples of controller integrated circuits (IC) that can be employed in the resonant converter stage 93 of the LED driver 25 may include Semtech's TS80000 wireless charging transmitter IC and its sister component, the TS81001 receiver IC. The TS80000 looks after the backscatter modulation decoding and adjusts the energy levels accordingly.

Referring to FIG. 7, the wireless transmitter coil, i.e., inductive transmitter coil (Tx) 55, that receives the high frequency AC voltage from the resonant converter stage 93 is used to magnetically couple the energy to the receiver coil, i.e., inductive receiver coil (Rx). The inductive transmitter coil (Tx) 55 converts the electrical energy into magnetic energy. In some embodiments, a layer of magnetic material is used under the inductive transmitter coil (Tx) 55 to minimize the leakage of the magnetic field from getting coupled into free space and causing radiated electromagnetic interference. Further description of the inductive transmitter coil (Tx) is provided above with reference to FIGS. 1-6.

Referring to FIG. 7, the wireless receiver coil, i.e., inductive receiver coil (Rx) 60, converts the magnetic energy transmitted from the inductive transmitter coil (Tx) 55, back into electrical energy. In some embodiments, a layer of magnetic material is used under the inductive receiver coil (Rx) 60 to minimize the leakage of the magnetic field from getting coupled into free space and causing radiated electromagnetic interference. Further description of the inductive receiver coil (Rx) is provided above with reference to FIGS. 1-6.

The inductive transmission coil (Tx) 55 and the inductive receiver coil (Rx) 60 together provides the electrical isolation from the input voltage thus preventing the need for more expensive v0 rated optical diffuser in the bulb. This also helps mitigate the potential electric shock hazard to the user.

Referring to FIG. 7, the components of the inductive receiver coil (Rx) 60 portion of the electronics package includes a receiver coil matching network 94, rectifier and filter 95, output regulator 96 and LED load portion 97. These components may be integrated into the light emitting diode (LED) printed circuit board (PCB) which is present in the base 10 of the lamp 100, as depicted in FIGS. 1 and 2.

Referring to FIG. 7, the matching network portion 94 ensures that the receiver coil (Rx) 60 is matched to the resonant frequency of the inductive transmission coil (Tx) 55, and hence maximum power transfer between them. The resonant topology is more tolerant to distance between the inductive transmission coil (Tx) 55 and the inductive receiver coil (Rx) 60, and minimizes the power loss between them.

The rectifier and filter section 95 rectifies the high frequency AC voltage in a DC voltage and filter the ripple content. The output of this section is a DC voltage with a minimized amount of ripple.

The output regulator section 96 regulates the output voltage and output current as required by the LED load. This can be a simple linear regulator to a more sophisticated switching regulator depending of the needs of the LED load and the overall lamp specifications. Protections such as overvoltage and overcurrent can be built into this stage as necessary.

The LED load section 97 operated from the DC power provided by the output section and generates the necessary light output for the lamp 100.

Figure 9:
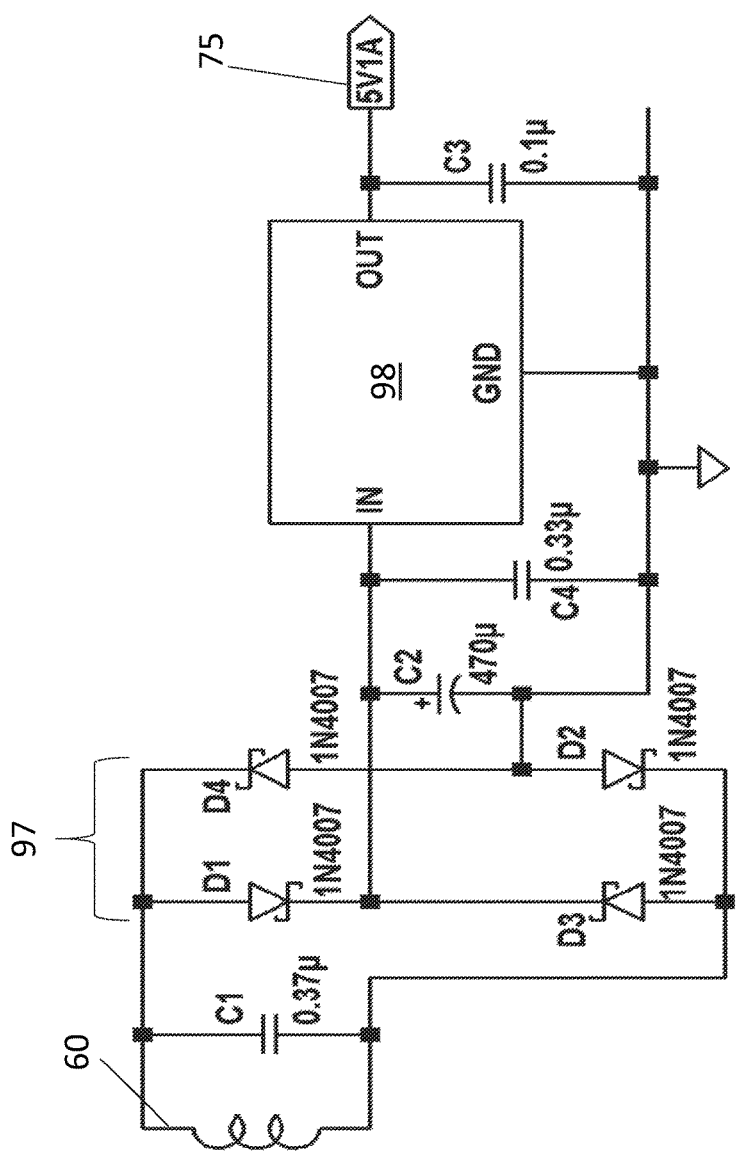
FIG. 9 is a circuit diagram illustrating the components of the inductive receiver coil (Rx) portion of the electronics package including a receiver coil matching network, a rectifier and filter, an output regulator and an LED load portion.

FIG. 9 is a circuit diagram illustrating one embodiment of the components of the inductive receiver coil (Rx) portion of the electronics package. In some embodiments, a full wave bridge rectifier 97 is used to rectify the high frequency voltage into a pulsating DC signal. In this example, the full wave bridge rectifier 97 provides at least a first portion of the rectifier and filter section 95 of the inductive receiver coil (Rx) 60 portion of the electronics package. In the example depicted in FIG. 9, the capacitor identified by C1 can provide a portion of a network portion 94 of the inductive receiver coil (Rx) 60 portion of the electronics package.

The electrolytic capacitor identified by C2 in FIG. 9 can be used as a filter to smooth out the ripple DC voltage from the output of the bridge rectifier 97. The capacitor C2 will reduce the ripple based on the discharge time constant of its capacitance. In this example, the electrolytic capacitor identified by C2 provides at least a second portion of the rectifier and filter section 95 of the inductive receiver coil (Rx) 60 portion of the electronics package.

The circuit diagram of the inductive receiver coil (Rx) portion of the electronics package further includes a linear voltage regulator identified by reference number 98. In one embodiment, the linear voltage regulator may be type 78xx, which is a family of self-contained fixed linear voltage regulator integrated circuits. The 78xx line are positive voltage regulators: they produce a voltage that is positive relative to a common ground. There is a related line of 79xx devices which are complementary negative voltage regulators. 78xx and 79xx ICs can be used in combination to provide positive and negative supply voltages in the same circuit. The 78xx ICs have three terminals and are commonly found in the TO-220 form factor, although they are available in surface-mount, TO-92, and TO-3 packages. The 78xx ICs support an input voltage anywhere from around 2.5 volts over the intended output voltage up to a maximum of 35 to 40 volts depending on the model, and typically provide 1 or 1.5 amperes of current (though smaller or larger packages may have a lower or higher current rating). In one example, the linear voltage regulator identified by reference number 98 is provided by voltage regulator 7805, which has a 5-volt output.

In this example, the linear voltage regulator identified by reference number 98 in FIG. 9 provides the output regulator section 96 of the inductive receiver coil (Rx) 60 portion of the electronics package that is depicted in FIG. 7.

Referring to FIG. 9, the capacitors identified by reference numbers C3 and C4 are decoupling capacitors. In one example, the decoupling capacitors C3, C4 may provide a portion of the LED load portion 75 of the inductive receiver coil (Rx) portion of the electronics package that is illustrated in FIG. 7. The decoupling capacitors C3, C4 can filter out high frequency noise that may still be present at the output stage. A constant voltage is supplied to the light engine 75.

The lamp structures provided herein enables the transfer of energy magnetically (and also wirelessly) from the inductive transmission coil (Tx) 55 that is in electrical communication with the energy source from the lamp fixture; and the inductive receiver coil (Rx) 60 that is in electrical communication with the light engine 75. The inductive (and wireless) connection 50 of the inductive transmission coil (Tx) 55 and the inductive receiver coil (Rx) 60 provides greater freedom in the design of the housing 10 of the lamp 100, and reduces requirements for the lamp assembly accuracy during serial production. The lamp structures provided herein can allow for a universal driver approach, i.e., a universal driver assembly 25 approach. For example, the driver section of the electronics package can accept both 120V and 230V inputs, and can be used for bulb applications in different countries where the grid voltage is between 85V and 264V and 47 Hz to 63 Hz In these embodiments, only the driver portion on the inductive receiver coil (Rx) side needs to be designed for specific light engine voltage and current.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of a lamp with an inductive connection to the light engine of the lamp, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lamp comprising: a housing including a light projecting end and a base having an electrical connector for connection with a lamp fixture; a light engine positioned at the light projecting end of the housing; a driver assembly in electrical communication with the electrical connector of the base of the housing; and an inductive connection positioned between the driver assembly and the light engine, the inductive connection comprises a transmission coil in the driver assembly, and a receiver coil in the light engine that provides for the transfer of energy magnetically from the driver assembly to the light engine, and the driver assembly comprises a printed circuit board including an electromagnetic interference (EMI) rectifier, a power factor correction (PFC) regulator, and a resonant converter stage, wherein the electromagnetic interference (EMI) rectifier is in physical electrical connection with an electrical connector of the base, and the resonant converter stage is in physical electrical connection with the inductive transmission coil (Tx) of the inductive connection;

wherein the light engine includes a light engine printed circuit board (PCB), the light engine PCB includes a network matching in physical electrical connection with the inductive receiver coil (Rx), a rectifier and filter portion that converts the AC voltage from the inductive receiver coil to DC voltage, an output regulator that regulates the DC voltage to an amount for an LED load for use by the light engine, and an LED load portion in physical electrical connection with the light engine.

2. The lamp of claim 1, wherein the light engine includes a light emitting diode (LED).

3. The lamp of claim 2, wherein the light emitting diode (LED) that is present in the light engine is a plurality of light emitting diodes (LEDs) in at least one light emitting diode (LED) filament structure.

4. The lamp of claim 1, wherein the transfer of energy from the transmission coil to the receiver coil is wireless.

5. The lamp of claim 2, wherein transmission coil is physically separated from the receiver coil and there is no physical electrical connection between the transmission coil and the receiver coil.

6. The lamp of claim 1, wherein the transmission coil comprises at least one first wire coil and the receiver coil comprises at least one second wire coil.

7. The lamp of claim 1, wherein the driver assembly accepts a 120 V input or a 230 V input.

8. The lamp of claim 1, wherein the driver assembly includes a resonant converter that generates AC voltage for the inductive transmission coil having a frequency greater than 110 KHz.

9. The lamp of claim 1, wherein the output regulator that regulates the DC voltage to the amount for the LED load provides a DC voltage ranging from 5 V to 300 V.

10. A lamp comprising: a housing including a light projecting end and a base having an electrical connector for connection with a lamp fixture; a light engine positioned at the light projecting end of the housing; a driver assembly in electrical communication with the electrical connector of the base of the housing; and an inductive connection including at least one graphene based inductor positioned between the driver assembly and the light engine, the at least one graphene based inductor including a transmission coil in the driver assembly, and a receiver coil in the light engine that provides for the transfer of energy magnetically from the driver assembly to the light engine, and the driver assembly comprises a printed circuit board including an electromagnetic interference (EMI) rectifier, a power factor correction (PFC) regulator, and a resonant converter stage, wherein the electromagnetic interference (EMI) rectifier is in physical electrical connection with an electrical connector of the base, and the resonant converter stage is in physical electrical connection with the transmission coil of the inductive connection of the at least one graphene based inductor;

wherein the light engine includes a light engine printed circuit board (PCB), the light engine PCB includes a network matching in physical electrical connection with the inductive receiver coil (Rx), a rectifier and filter portion that converts the AC voltage from the inductive receiver coil to DC voltage, an output regulator that regulates the DC voltage to an amount for an LED load for use by the light engine, and an LED load portion in physical electrical connection with the light engine.

11. The lamp of claim 10, wherein the light engine includes a light emitting diode (LED).

12. The lamp of claim 11, wherein the light emitting diode (LED) that is present in the light engine is a plurality of light emitting diodes (LEDs) in at least one light emitting diode (LED) filament structure.

13. The lamp of claim 11, wherein the graphene inductor comprises a bromine-intercalated graphene spiral.

\* \* \* \* \*